United States Patent
Ritzén et al.

(10) Patent No.: US 7,763,117 B2
(45) Date of Patent: Jul. 27, 2010

(54) METHOD FOR THE MANUFACTURE OF EXTENDED STEEL PRODUCTS

(75) Inventors: Ola Ritzén, Åkersberga (SE); Tomas Ekman, Saltsjö-Boo (SE); Lennart Rangmark, Älvsjö (SE)

(73) Assignee: AGA AB, Lidingö (SE)

( * ) Notice: Subject to any disclaimer, the term of this patent is extended or adjusted under 35 U.S.C. 154(b) by 734 days.

(21) Appl. No.: 10/557,564

(22) PCT Filed: Oct. 19, 2005

(86) PCT No.: PCT/SE2005/001559

§ 371 (c)(1),
(2), (4) Date: Sep. 11, 2006

(87) PCT Pub. No.: WO2006/046905

PCT Pub. Date: May 4, 2006

(65) Prior Publication Data

US 2007/0181233 A1 Aug. 9, 2007

(30) Foreign Application Priority Data

Oct. 29, 2004 (SE) .................................. 0402622

(51) Int. Cl.
*B08B 7/00* (2006.01)
(52) U.S. Cl. .................. 134/19; 134/20; 134/15; 134/39; 148/579
(58) Field of Classification Search .............. 134/15, 134/19, 42, 20, 39; 148/623, 579, 633
See application file for complete search history.

(56) References Cited

U.S. PATENT DOCUMENTS 3,052,014 A * 9/1962 Falcon ..................... 428/606
3,342,241 A * 9/1967 Whitesides ................. 432/219
3,532,329 A * 10/1970 Bloom ......................... 432/65
3,924,035 A * 12/1975 Miller ........................ 427/327

(Continued)

FOREIGN PATENT DOCUMENTS

FR 2 846 341 A1 4/2004

(Continued)

OTHER PUBLICATIONS

Machine Translation: JP09059714A to Suminaga et al. Mar. 1997.*

(Continued)

*Primary Examiner*—Michael Kornakov
*Assistant Examiner*—Naomi Birbach
(74) *Attorney, Agent, or Firm*—Alfred J. Mangels

(57) ABSTRACT

A method for the manufacture of extended steel products. The steel product is initially contaminated by oils and by at least one of organic and inorganic particles that are suspended or dissolved in the oils. Following the shaping of the steel product by working but before the subsequent treatment of the steel product, burners emit exhaust gases that interact directly with the surface of the steel product. The burners are driven by an oxidant that contains at least 80% oxygen by weight, whereby oils that are present on the product are vaporized and combusted. The exhaust gases interact with the surface of the steel product with a speed that is sufficiently high to blow away organic and/or inorganic particles from the surface of the steel product.

10 Claims, 1 Drawing Sheet

U.S. PATENT DOCUMENTS

| | | | | |
|---|---|---|---|---|
| 3,983,305 A | * | 9/1976 | Peters et al. | 428/467 |
| 4,349,393 A | | 9/1982 | Paulus et al. | 148/623 |
| 4,872,294 A | * | 10/1989 | Watts | 451/83 |
| 5,674,064 A | * | 10/1997 | Francis, Jr. | 431/4 |
| 2001/0036611 A1 | * | 11/2001 | Satchell et al. | 432/19 |

FOREIGN PATENT DOCUMENTS

| | | |
|---|---|---|
| JP | 1 2 22043 A | 9/1989 |
| JP | 32 49135 A | 11/1991 |
| JP | 09059714 A * | 3/1997 |

OTHER PUBLICATIONS

Machine Translation: FR 286341 A1 to Le Gouefflec, et al. Apr. 2004.*

Abstract: FR 286341 A1 to Le Gouefflec, et al. Apr. 2004.*

* cited by examiner

METHOD FOR THE MANUFACTURE OF EXTENDED STEEL PRODUCTS

BACKGROUND OF THE INVENTION

1. Field of the Invention

The present method relates to a method for the manufacture of extended steel products.

2. Description of the Related Art

When manufacturing tape, wire, and sheet products from steel, these are manufactured as extended products. The surfaces of the products are contaminated during the manufacture by oils and by organic and/or inorganic particles that are dissolved or suspended in the oils.

The oils may be emulsions, roller oils, polymers, lubricants, etc. The organic particles may be carbon or carbon compounds. Inorganic particles may be particles of steel, oxides, etc.

Such an oil film causes quality problems in later process steps if it is not removed. For this reason, such oil residues are currently removed with the aid of solvents in washing stages, before the product is transferred to a subsequent treatment, such as a heating furnace or a heat-treatment furnace.

This means that the process line becomes longer and more expensive than would be the case if it was not necessary to wash away the oil film. Furthermore, the washing stage results in the manufacturer receiving a residual, which may be classified as harmful to the environment, from the wash.

The present invention solves this problem.

SUMMARY OF THE INVENTION

The present invention thus relates to a method for the manufacture of extended steel products. Following the shaping of the product by working, but before the subsequent treatment of the steel product, the steel product is contaminated by oils and by at least one of organic and inorganic particles that are suspended or dissolved in the oils. Burners emit exhaust gases that interact directly with the surface of the steel product, in that the burners are driven by an oxidant that contains at least 80% oxygen by weight. Oils that are present on the products are vaporized and combusted, and the exhaust gases interact with the surface of the steel product with a speed that is sufficiently high to blow away organic and/or inorganic particles from the surface of the steel product.

BRIEF DESCRIPTION OF THE DRAWINGS

The invention is described in more detail below, partially in association with embodiments of the invention shown in the attached drawing, where.

DESCRIPTION OF THE PREFERRED EMBODIMENTS

Figure 1:
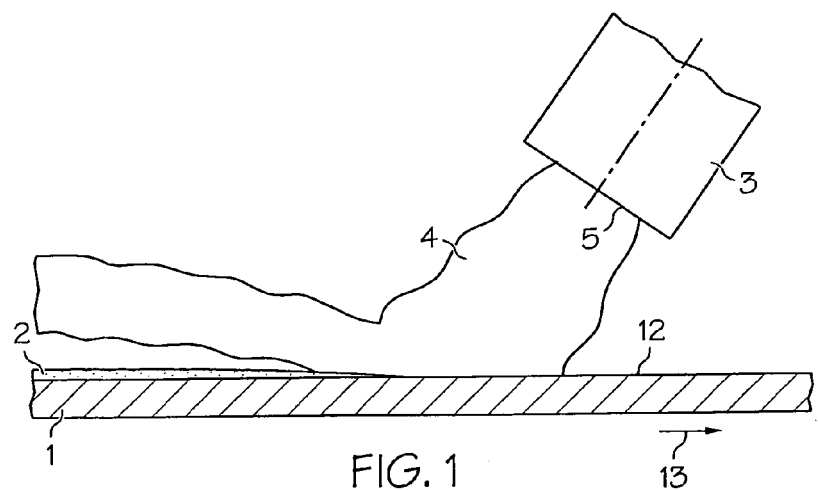
FIG. 1 shows a burner and a steel product.

The invention is described below in association with processing lines, but the invention is in no way limited to any particular processing line or any particular steel products. It can be applied in connection with any form of processing lines and for any type of extended steel products. Because the equipment required to carry out the present method is relatively compact, it can be introduced into an existing processing line, preferably one in which the steel product is to be heated for a subsequent treatment.

The present method concerns the manufacture of extended steel products 1, following shaping of the steel product through working, but before further treatment of the steel product. The product is often at this time contaminated by oils and by inorganic particles dissolved in these oils. This is illustrated by the film 2 in FIG. 1.

According to the invention, the burner 3 emits exhaust gases 4 that interact directly with the surface of the steel product 1. The term "exhaust gases" is here used to denote both combustion products and gas components that have not yet been combusted and that leave the burners. The burners are driven by a fuel along with an oxidant that contains at least 80% oxygen gas by weight, whereby oils in film 2 that are present on the steel products are vaporized and combusted. Furthermore, the exhaust gas 4 interacts with the surface of the steel product 1 at a velocity that is sufficiently high to blow away inorganic particles from the surface of the steel product.

The oxidant normally consists of oxygen gas together with argon and nitrogen gas. The fuel is a gaseous fuel, and it may be propane, butane, hydrogen gas, natural gas, etc.

The present principle is to achieve a rapid evaporation of the contaminants through a very rapid heating of the steel surface and the contaminant layer, and an immediate combustion of the gases that are thus formed, but without overheating the steel material itself. This is achieved by the use of burners designed for the purpose, which burners are driven by an oxidant that contains more than 80% oxygen gas and which deliver, through their design, heat and an excess of oxygen to a region close to the steel surface. The products of the combustion and the particles that are not combusted will be transported away from the steel surface.

The excess of oxygen is to be sufficiently large so that combustion of the oil film takes place. The magnitude of the excess of oxygen needs to be of the order of 10%.

Thus, the result is a clean steel surface, where the oils have contributed to the heating of the steel product.

A very significant application of the present invention is during the manufacture of products that are to be galvanized or provided with an organic coating, such as a paint or polymer, in a subsequent treatment.

FIG. 1 shows a burner 3, the exhaust gases 4 of which interact with the surface of the steel product. The product has an oil layer 2 at the left side of the drawing. The oil layer and inorganic contaminants have been removed from the steel product surface 12 at the right side of the drawing.

Figure 2:
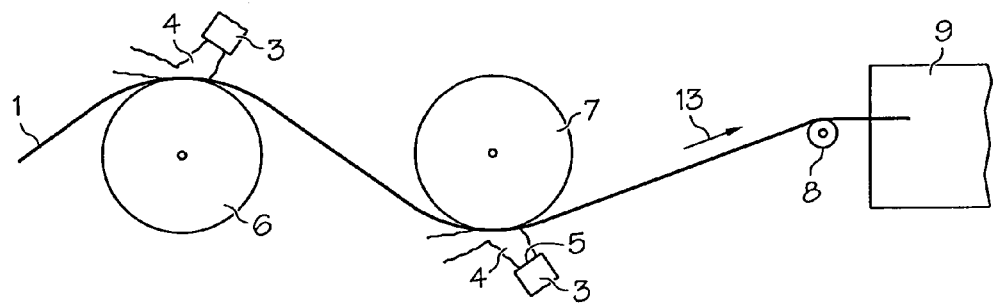
FIG. 2 shows a part of the processing line with burners.
Figure 3:
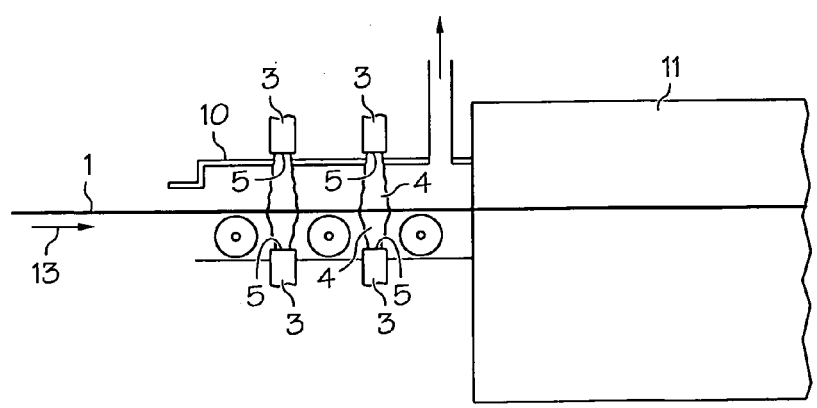
FIG. 3 shows a part of another processing line with burners.

The arrow 13 in each of FIGS. 1-3 shows the direction of motion of the steel product.

FIG. 2 shows an example in which the burners 3 have been installed in an existing processing line having guide rollers 6, 7, and 8 and a subsequent treatment unit 9 for the steel product 1. This illustrates that the burners can be installed at a freely chosen position prior to a treatment unit.

FIG. 3 shows burners 3 located in a unit 10 that is an auxiliary unit on a treatment unit 11.

In order to ensure that inorganic particles are blown away, the exhaust gases 4 leave the burners 3 with a velocity that is at least 25 meters/sec. The velocity is normally of the order of magnitude of 100 meters/sec during operation.

It will present one skilled in the arts with no difficulty to calculate the number of burners required and the dimensions that are required in order to achieve the interaction of the exhaust gases from the burners with the complete surface of the steel product at the velocity specified.

It is preferred that the burners 3 heat the steel product 1 to a temperature within the range of 100° C. to 800° C. It is, however, important not to heat the surface of the steel product to such a high temperature that any solid particles present can reattach to the surface of the steel.

It is, however, preferred in certain cases that the burners heat the surface 12 of the steel product to a temperature that is close to but does not exceed its melting point.

With the aim of achieving the desired effect of the combustion of oils and the blowing away of particles, it is preferred that the distance between the outlet opening 5 of the burners 3 and the steel product 1 should be between 50-250 millimeters. The outlet opening 5 of the burners thus has a diameter that does not exceed the said distance. A suitable diameter lies within the range approximately 10-15 millimeters.

The burners 3 may be, but do not need to be, located such that the combustion products impact the material at an angle that is not 90° to the surface of the steel product.

The present invention makes it possible for the user to avoid operating a separate washing plant, which in turn removes the necessity for handling solvents that harm the environment.

The present process also makes it possible to avoid the formation of a residual product based on solvents, which in turn must be destroyed in an approved facility.

Furthermore, the energy content of the contaminant is used directly in the process.

Furthermore, the exhaust gases that are generated from the combusted oils can be handled in exhaust gas treatment plants that already exist.

A number of embodiments have been described above. The invention, however, can be varied with respect to the number of burners, and their locations and dimensions, in order to adapt it for the particular products.

Thus, the present invention is not to be regarded as being limited to the embodiments specified above. It can be varied within the framework specified by the attached claims.

What is claimed is:

1. A method for the manufacture of extended steel products, wherein an extended steel product surface is contaminated by oils and by at least one of organic and inorganic particles that are suspended or dissolved in the oils, said method comprising the steps of: following the shaping of the extended steel product by working, but before a subsequent treatment of the steel product, fueling burners with a fuel and an oxidant that contains at least 80% oxygen by weight to provide an excess of oxygen that is in excess of that required to combust the fuel: emitting from the burners exhaust gases that include both combustion products and gas components that have not been combusted, to interact directly with the surface of the steel product: directing the exhaust gases at the surface of the steel product at a velocity that is at least 25 meters/sec to blow away organic and/or inorganic particles from the surface of the steel product: and vaporizing surface oils that are present on the surface of the product with heat from combustion of the fuel and oxidant, and combusting the vaporized surface oils with the excess oxygen.

2. The method according to claim 1, wherein the burners are positioned at an angle between a longitudinal axis of the burner and the surface of the steel product that is between 45 and 90 degrees.

3. The method according to claim 1, wherein the burners heat the steel product to a temperature that is in the range of from 100° C. to 800° C.

4. The method according to claim 1, wherein the burners heat the surface of the steel product to a temperature that is below its melting point.

5. The method according to claim 1, wherein a spacing between an outlet opening of the burners and the steel product surface is 50 to 250 millimeters.

6. The method according to claim 1, wherein the excess oxygen is about 10%.

7. A method for the manufacture of extended steel products, wherein an extended steel product surface is contaminated by oils and by at least one of organic and inorganic particles that are suspended or dissolved in the oils, said method comprising the steps of:
following the shaping of an extended steel product by working, but before a subsequent treatment of the steel product, fueling burners with a fuel and an oxidant that contains at least 80% oxygen by weight to provide an excess of oxygen that is in excess of that required to combust the fuel;
emitting from the burners exhaust gases that include both combustion products and gas components that have not been combusted, to interact directly with the surface of the steel product, wherein the burners are positioned at an angle between a longitudinal axis of the burner and the surface of the steel product that is between 45 and 90 degrees, and wherein a spacing between an outlet opening of the burners and the steel product surface is 50 to 250 millimeters;
directing the exhaust gases at the surface of the steel product at a velocity that is at least 25 meters/sec to blow away organic and/or inorganic particles from the surface of the steel product; and
vaporizing surface oils that are present on the surface of the product with heat from combustion of the fuel and oxidant, and combusting the vaporized surface oils with the excess oxygen.

8. The method according to claim 7, wherein the burners heat the steel product to a temperature that is in the range of from 100° C. to 800° C.

9. The method according to claim 7, wherein the burners heat the surface of the steel product to a temperature that is below its melting point.

10. The method according to claim 7, wherein the excess oxygen is about 10%.

* * * * *